INVENTOR.
Joel B. Guin

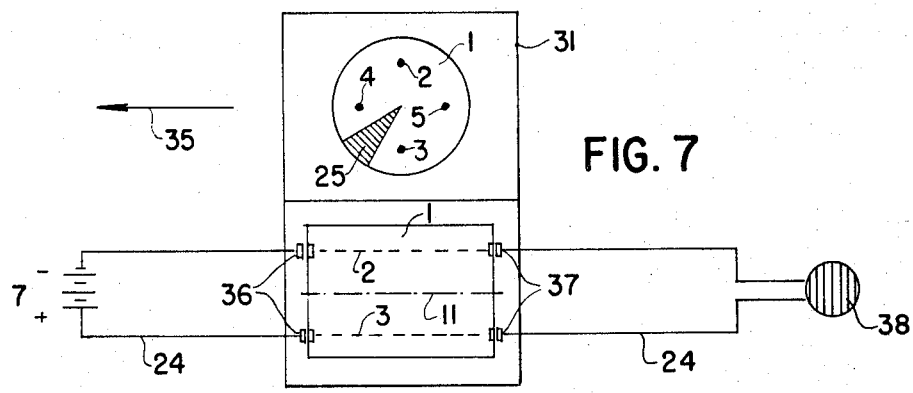
FIG. 7
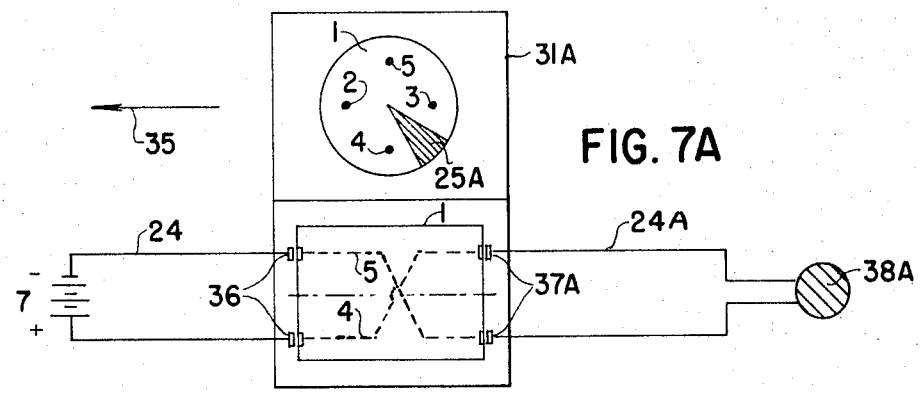
FIG. 7A
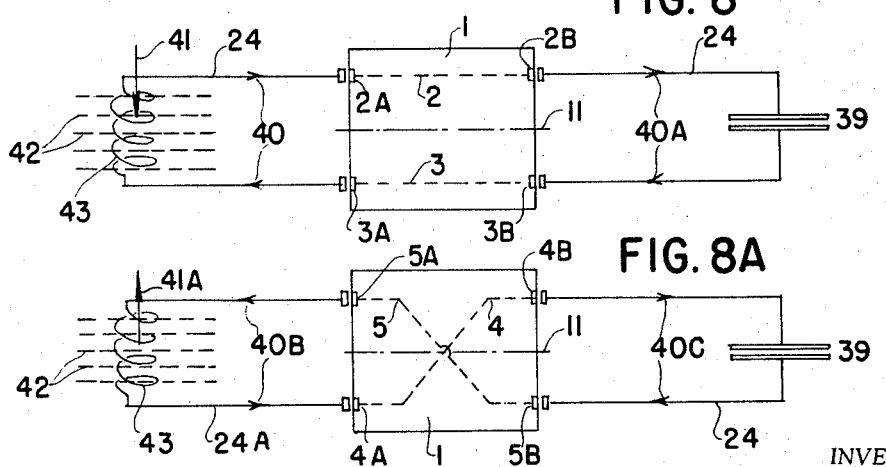
FIG. 8
FIG. 8A
INVENTOR.
Joel B. Guin

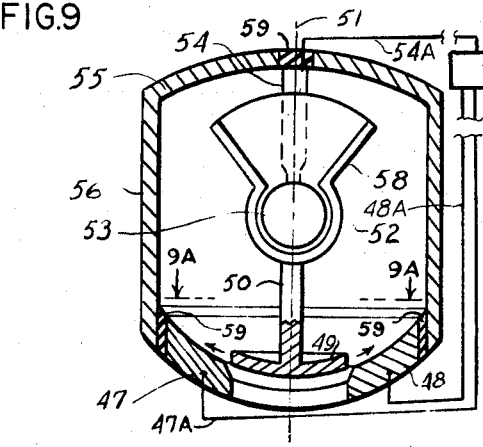
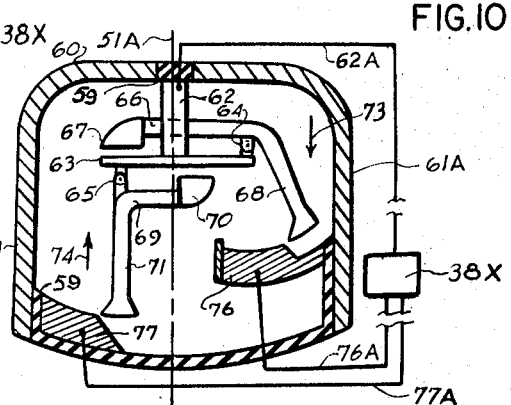
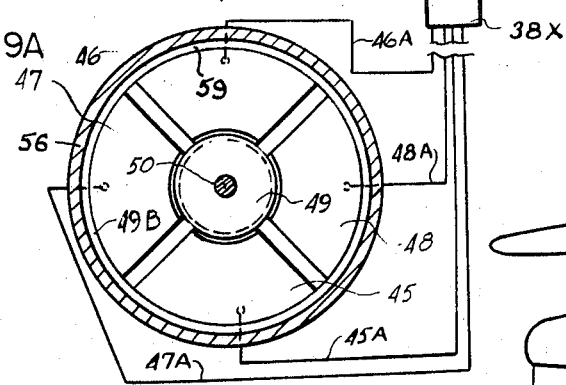
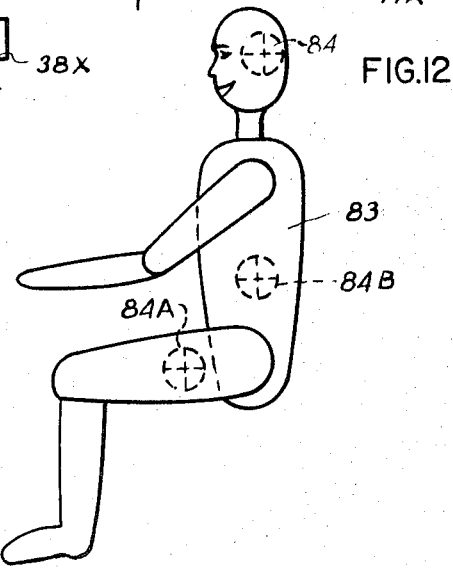
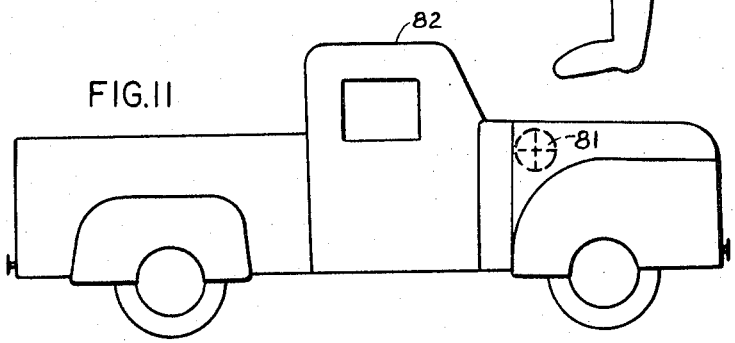
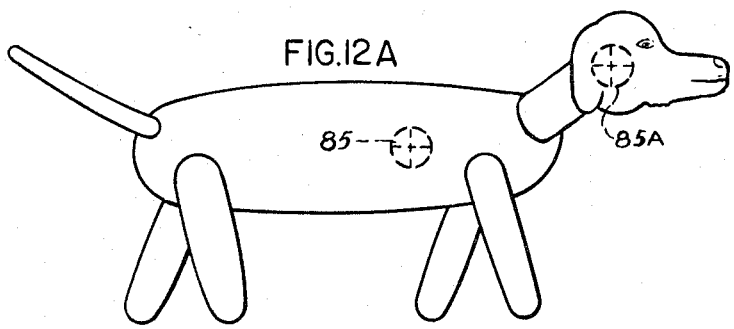
*INVENTOR.*
JOEL B. GUIN … # 3,423,746
INERTIAL ACTIVATOR DEVICE
Joel B. Guin, 148 E. 48th St.,
New York, N.Y. 10017
Filed Sept. 20, 1965, Ser. No. 488,591
U.S. Cl. 340—262   3 Claims
Int. Cl. G08b 21/00

ABSTRACT OF THE DISCLOSURE

The inertial activator device uses a routine acceleration in direction or speed of an object to reverse an electrical circuit or to form a new circuit to signal the change, the preferred embodiment having a cylindrical drum mounted to turn on its axis when a weighted section on one side of the axis is acted on by inertial forces set up by the acceleration, the drum having one or more pairs of electric wires running through it lengthwise and terminating in contacts that complete an electric circuit with corresponding contacts adjacent to the drum, separate positions of the drum completing separate electric circuits. An obvious application is an automobile safety device: different pairs of wires in the drum would form (with wires adjacent thereto and connected to different signalling means such as colored lights on the car or in an object in the car) a selected electric circuit to indicate by the signalling means the acceleration in speed or direction.

---

Other applications envisioned for the invention include: a component of signal lights and safety devices for truck, buses, rail road trains, rapid transit cars, airplanes, ships, floating vessels or any other moving object; a component of flow-control and/or safety devices for water, sewage, chemicals, petroleum products or any other flowing substance; a device for multiplying the potential activities and sounds of toys and other objects for increasing childhood joys. Since the major energy requirements can be supplied by anything from a dry-cell battery to an aviation or marine engine or generator, and since the total cost is quite small, the number of economical and practicable applications is numerous.

The application for changing direction is even more valuable than the one for changing speeds for floating vessels, especially at night. Often when two vessels are on a collision course neither can be sure of what the other is or is not doing until too late: a heavy vessel simply cannot respond to a change in either direction or speed enough to be detected, for several seconds, but a sensitive instrument will signal it as soon as the change is initiated. Until the change is revealed to the eye by the motion of the vessel, the officer on the other vessel cannot even be sure that his own vessel has been seen. This invention will eliminate much of the guess-work, and expedite the decision-making process on both vessels.

One of the most fertile fields for applying this invention is in industry. Indicators and activators of varying degrees of sensitivity can be used to signal ADP and EDP equipment about changes in speeds and direction of flow of liquids, and about changes of speed and direction of movement of industrial components.

In many processes one event depends on another, and in others one could happen more quickly if it were triggered by another, thus:

when a subway or commuter train stops, the doors could fly open; when a fork-lift stops the clutch could be let out at once; when an elevator starts, all doors are locked, when it stops the doors should fly open, and if it falls (without the descending contacts being made) the emergency brakes should snap on at once; when a cutting, punching or drilling machine is lifted after an operation on an object, the object could be "kicked out" and replaced by another immediately; when a ladle of molten metal jerks or stops a warning buzzer should sound; when an overhead crane starts a buzzer should sound, if it jerks another warning should be sounded, and when it comes to its proper stop a third buzzer should sound and the cable should start down; when an internal combustion engine decelerates or idles the fuel mixture should be leaned; and in general when any potentially dangerous tool or machine starts, jerks, veers from its course, or stops, warnings should be given and proper corrective action should be initiated. In all these, the subject invention is one of the most economical means for activating appropriate measures.

Among scores of electric applications are:

loading a capacitor with both the up and the down motion of a coil within a magnetic field, the inertial activator reversing one of the directions of the current so that only DC current flows into the capacitor;

triggering an appropriate warning device as soon as dangerous electric equipment starts to move; and triggering appropriate emergency actions when potentially dangerous equipment starts, then activating it if anything goes wrong, thus, if enemy AA fire should kill the pilot and put one of our bombers in a spin, the automatic pilot could be switched on automatically to right the plane while a crew member comes forward who can fly the plane to a safer place.

One modification of the invention can be used to discourage theft of automobiles, luggage, purses, etc. and the opening of vaults, windows and doors, etc. by setting the inertial activator to give a visual, audible, mechanical or electrical signal if the object is moved in any way or in certain ways. Other modifications suitably applied will produce a toy that: moves in one direction till someone or something touches it, then reverses or turns 90 to 180 degrees to right or left; moves till it hits something, then starts to cry, squeal, bark, etc.; plays one type of music or sound till someone touches or moves it, then plays an entirely different type; a doll that hums or sings joyfully when seated upright or when chucked under the chin, that cries or sings a sad song when slapped or put over the knees, that talks (such as giving advice on childish behavior!) when stood upright, that sings a lullaby when placed on its back, etc.; a toy cat or bear that wags its tail or emits a joyful sound when patted or rubbed, but emits an angry sound if slapped or kicked and a toy dog that barks, growls, sings, talks, whines, gives advice on children's problems, etc. according to its posture. Patent applications on a number of these inventions will be filed by the present inventor during the coming year.

The above advantages and objects and the practicability of the suggested applications will become clear when the inclosed description is read carefully in conjunction with the accompanying drawings in which FIG. 1 is a perspective view of one version of the inertial activator, a rotatable drum with a 4-wire circuit;

FIG. 7 shows schematically the application of the inertial activator to a car signalling device, a caution light;

FIG. 7A shows an arrangement of FIG. 7 whereby a green light is caused to blink when the car accelerates;

FIG. 8 shows schematically the application of the invention to a capacitor loading circuit;

FIG. 8A is an arrangement of FIG. 8 changed so that the direction of the current is reversed, and loading continues;

FIG. 9 is a vertical section showing a pendulum for activating different circuit contacts with each of 4 directional movements;

FIG. 9A is a top view on all four contact plates of FIG. 9;

FIG. 10 is a vertical section showing double-action devices, one for closing one circuit after an upward movement, the other for closing another circuit after a downward movement;

FIG. 11 is a sketch of a toy truck showing a suggested place for the inertial activator device;

FIG. 12 is a doll and FIG. 12A is a toy dog, two of the numerous toy applications for which the inertial activator is designed.

Figure 1:
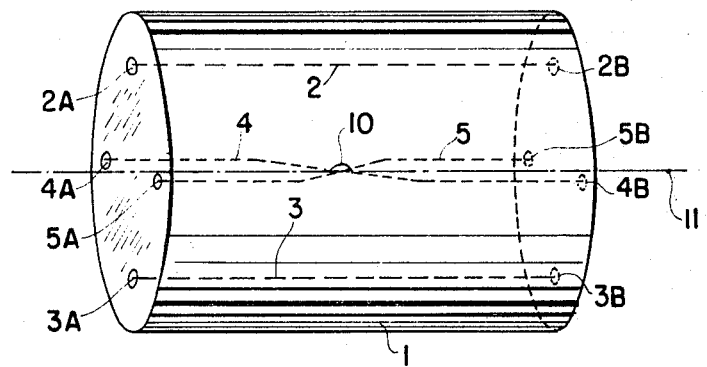

Turning now to the drawings, FIG. 1 is a perspective view of the activator switch in the form of a drum 1, with two straight wires 2 and 3, and two crossed wires 4 (including bridge 10) and 5 running through it. The left, or contact, ends of wires 2, 3, 4 and 5 are designated 2A, 3A, 4A and 5A respectively, and the right contact ends are designated 2B, 3B, 4B and 5B respectively. Activator drum 1 rotates around imaginary axis 11.

Figures 2, 2A:
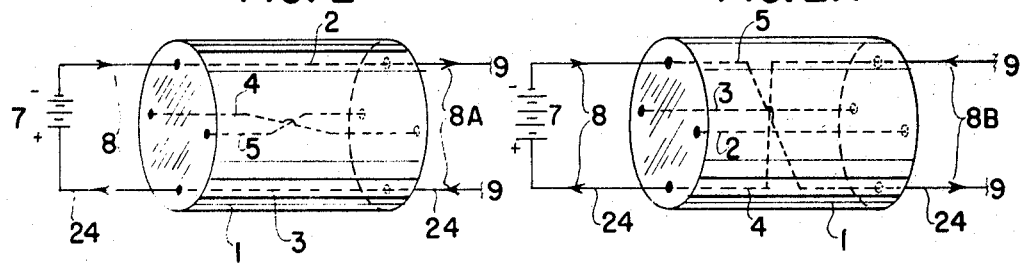
FIG. 2 shows schematically the connection of the two straight wires of the drum to an outside circuit.
FIG. 2A shows the connection of the two crossed wires within the drum to an outside circuit.

FIG. 2 and FIG. 2A show how an outside circuit 24 connects with straight wires 2 and 3, and with crossed wires 4 and 5, respectively. Circuit 24 is connected at the left with battery 7 and leads at the right to a load 9 on the circuit. In FIG. 2 the current at the left of drum 1, shown by arrows 8 continues as shown by arrows 8A to the right. In FIG. 2A the current at the right is indicated by arrows 8B, since it has been reversed by the wires.

Figure 3:
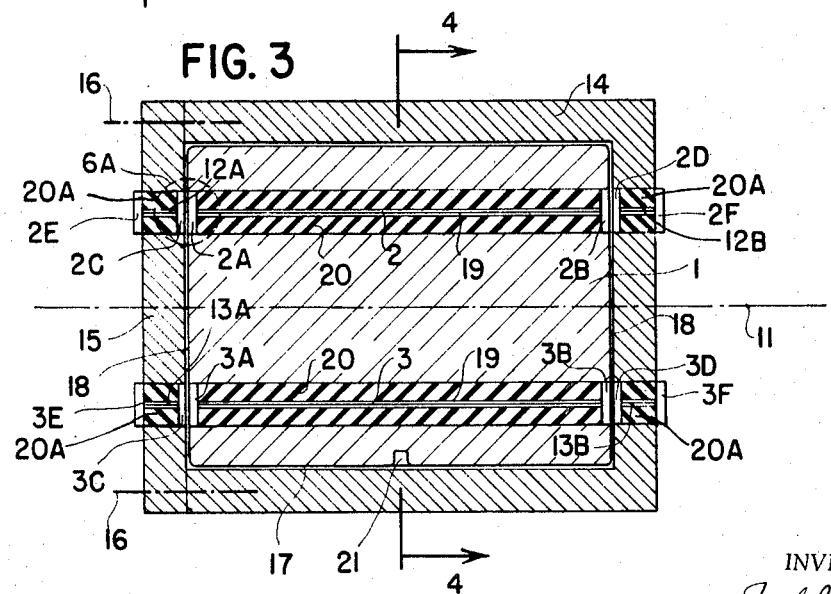
FIG. 3 is a vertical section along the main axis of the inertial switch within the plane of the two straight wires.

FIG. 3 is a vertical section along the main axis 11 of the activator device within the plane of straight wires 2 and 3. Switching drum 1, having groove 21, rotates freely within casing 14 and closure plate 15 attached thereto by screws 16. Between drum 1 and the outer structure is space 18. Straight wires 2 and 3 run through ducts 19 inside insulating tubes 20, and continue to the left and right into end contacts 2A and 2B, 3A and 3B respectively. The corresponding contacts in the outer structure are 2C and 2D for wire 2, and 3C and 3D for wire 3; these in turn continue into wires 12A and 12B, 13A and 13B respectively, which are joined as shown to outside contacts 2E and 2F, 3E and 3F respectively—all of which are surrounded by insulating tubes 20A.

Figure 4:
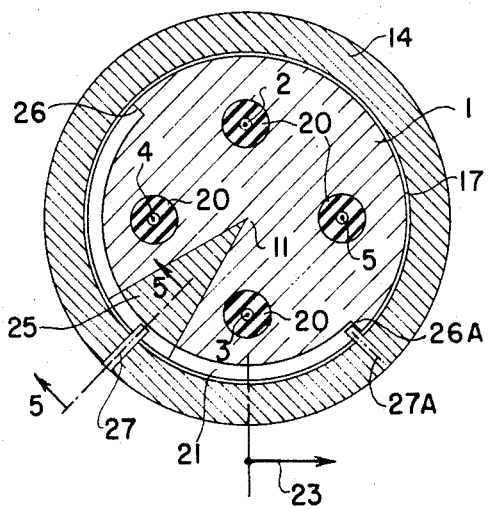
FIG. 4 is a vertical section along line 4—4 in FIG. 3.

FIG. 4 is a vertical section along line 4—4 in FIG. 3, showing a weighted section 25 of drum 1 at its "left" position, causing wires 2 and 3 to be at top and bottom respectively. Protruding into groove 21, which ends at edges 26 and 26A on the left and right respectively are stopping pins 27 and 27A on the left and right respectively. Weighted section 25 moved to the left as a result of an acceleration to the right of axis 11 of drum 1, as indicated by arrow 23. Groove edge 26A touches stopping pin 27A.

Figure 4A:
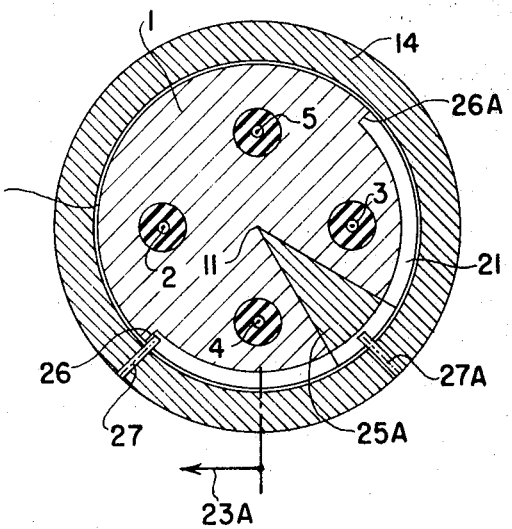
FIG. 4A shows the weighted section moved to the right.

FIG. 4A shows how weighted section 25 has moved to the right as the result of an acceleration to the left of axis 11, as indicated by arrow 23A, causing wires 4 and 5 to move to the bottom and top respectively (from the middle positions in FIG. 4), and moving groove edge 26 over against stopping pin 27.

Figure 5:
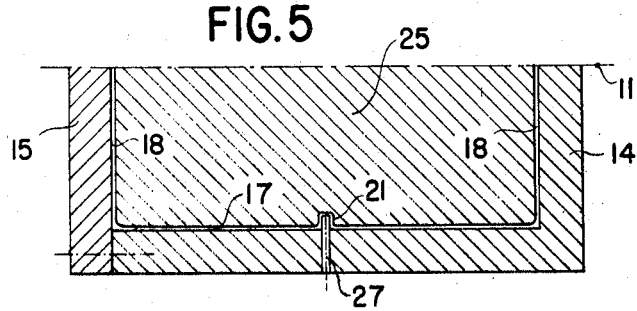
FIG. 5 is a section along line 5—5 in FIG. 4 showing the arrangement of the pin in the outer structure.

FIG. 5 is an angular section along line 5—5 in FIG. 4 showing position of stopping pin 27 within casing 14 and groove 21.

Figure 6:
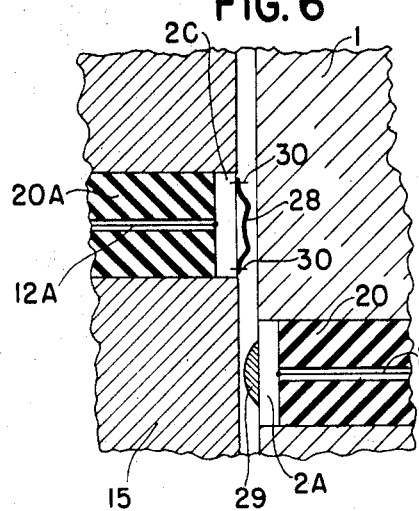
FIG. 6 shows switching contacts out of contact.
Figure 6A:
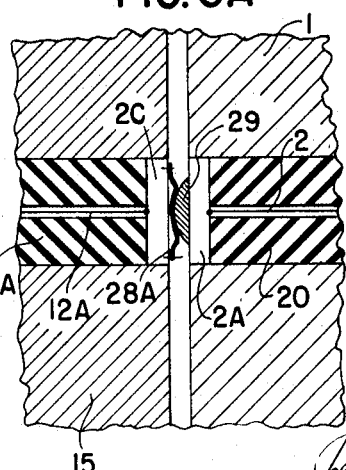
FIG. 6A shows the switching contacts touching.

FIG. 6 shows the wire contacts before and FIG. 6A shows the contacts after, they have made contact. FIG. 6A is an enlargement of section 6A in FIG. 3. In FIG. 6 contact spring 28 is fastened by means of screws 30 to contact 20, and contact 2A has a contact button 29. In FIG. 6A contact button 29 has moved into indentation 28 within spring 28A, pressing it closer to contact 20.

FIGS. 7 and 7A show the application of the activator device to a safety light, with arrows 35 showing the direction of car movement. FIG. 7 shows the wiring for deceleration, and FIG. 7A for acceleration. Boxes 31 and 31A respectively show the positions of components for deceleration and acceleration within drum 1, the upper portions showing a vertical section and the lower portions showing side views. In FIG. 7 deceleration has swung weighted section 25 to the left, bringing straight wires 2 and 3 into top and bottom positions respectively, so that they make contact on the left with contacts 36, and on the right with contacts 37 which continue on to red light 38, making it shine to give warning to the driver behind that deceleration is starting. In a sensitive instrument this will happen the moment the driver lifts his foot from his accelerator, and before it could start for the brake pedal, a process that could take 1 to 3 seconds for a slow-witted, indecisive person. In FIG. 7A acceleration has caused weighted section 25A to swing to the right, bringing wires 4 and 5 into bottom and top positions respectively where they make contact on the left with contacts 36 (as before in FIG. 7) and on the right with contacts 37A which lead through circuit 24A to green light 38A which shines to notify the driver behind that the car is beginning to accelerate. If this should happen in thick traffic it could serve to warn drivers in both lanes behind that the driver whose green light has shone is about to pull out to pass a car ahead, thus preventing them from trying to move into the same space he is headed for: such foreknowledge would prevent many accidents on thickly travelled throughways.

FIGS. 8 and 8A show schematically the application of the activator device to a capacitor loading unit. Current is produced when coil 43 moves upward or downward through the magnetic field indicated by arrows 42, the direction of movement being shown by arrows 41A and 41 respectively. The induced current to the left of drum 1 as shown by arrows 40 in FIG. 8, passes through the drum where contact is made with circuit 24, thus loading capacitor 39. Arrows 40A show the direction of circuit 24 into and out of the capacitor. The upward movement shown by arrow 41A if FIG. 8A produces current flowing in the direction of arrows 40B: but the same upward movement has swung crossed wires 4 and 5 into position where they contact circuits 24A and 24 in such way as to reverse the current so that it flows in the same direction as in FIG. 8 to load capacitor 39, the current flowing as shown by arrows 40C, the same as 40A.

FIGS. 9 and 9A show a vertical section of one of many possible modifications of the activator switch drum of FIG. 1, consisting of a pendulum 50 having radial symmetry about axis 51. The pendulum hangs from a hollow circular structure 52 which is mounted rotatably around and is supported by the spherical end 53 of rod 54 attached to the top 55 of container 56: electric current can flow between structures 52 and 53. Hollow structure 52 extends radially to form an optional truncated cone 58 which is carefully designed and built to exactly counterbalance the weight of pendulum 50 when it swings to either side, to prevent it from swinging back until acted upon by another force. When pendulum 50 swings in any direction circular contact 49, which is an extension of the pendulum, closes a circuit by touching one of the contact plates 47, 48, 45 and 46 (the latter shown only in FIG. 9A) which are connected to wires 47A, 48A, 45A and 46A respectively: these lead to an electrically powered activation means which is selectively chosen to perform a desired function and is given the indefinite number 38X. Wire 54A connects support rod 54 with the activation means 38X to close the circuit from circular contact 49 on pendulum 50.

FIG. 10 shows another modification, designed to supplement the device in FIG. 9 by providing a means for registering accelerations in the vertical direction. From the top 60 of container 61 is suspended bar 62 to which is connected horizontal support 63 having two bearings attached: pressure bearing 64 above on which is movably mounted horizontal bar 66 having counterweight 67 attached to one end and lower bar 68 to the other end; and hinge bearing 65 which supports and to which is attached horizontal support 69 having counterweight 70 attached to one end and vertical bar 71 to the other end. In case of downward acceleration as shown by arrow 73, counterweight 67 causes lower bar 68 to move left along contact plate 76, to which is attached wire 76A, thus closing a connection with activation means 38X, plate 76 being attached to and supported by container wall 61A. An upward acceleration as shown by arrow 74 causes vertical bar 71 to move left along contact plate 77 to which is connected wire 77A, thus closing a connection with activation means 38X. Wire 62A leading from bar 62 closes the circuit with activation means 38X. Current can flow from bar 68 or bar 71 through bar 62 when contact with a plate is made. Shaded sections 59 represent all the insulation in FIG. 10 as well as in FIGS. 9 and 9A.

FIG. 11 is one of many possible applications of the inertial activation device to a mechanical object. Truck 82, which may be a real truck, or a toy, can have the device installed as indicated by dotted circle 81, either as part of a semi-automated system for operating trucks, or as a device to make a toy truck reverse directions, turn right or turn left, or blow its horn.

FIGS. 12 and 12A show two of a large number of toy applications of the inertial device to toys. Pendulum device 50 in FIG. 9 can be installed at such places in doll 83 as indicated by dotted circles 84, 84A and 84B. Single devices could cause the doll to perform in a variety of ways: to talk when it sits upright; to sing when it leans forward; to cry when laid across someone's knee; to laugh when raised suddenly; to scream or gurgle joyfully when suddenly lowered, etc. If the pendulum is placed at 84A or 84B a different combination of reactions could be performed. A far more complicated wiring system, and more expensive, would be required to correlate the circuits of one pendulum with one or more pendulums placed in the other places, but the variety of visual, audible and physical performances by the doll (or other toy) would be far greater than those of any toys made today. Economic resources of maker and buyer are the main limitations here. Similarly one or more pendulums could be placed in the toy dog in FIG. 12A, in such places as shown by dotted circles 85 and 85A. Depending on which contact plate (47, 48, 45 or 46 in FIG. 9A) is touched by circular plate 49 on pendulum 50 in FIG. 9, as the dog's body assumes various positions, the dog could be caused to respond in a variety of humorous, entertaining, instructive or inspiring ways to simple movements, or combinations of movements (depending on whether one or more devices is installed), of which the following are suggestive only: he sings if standing on all four legs; he growls if slapped, kicked or pushed; he whimpers if placed on his side; he barks if placed face down; he prays if placed on his knees; he gives a humorous talk if sitting on his hind quarters; he gives a serious lecture (such as on good behavior for children!) when seated with his front feet touching the floor between his rear feet, etc. Various physical reactions can replace or accompany these audible ones. The sound and mechanical devices to make these possible are all in "the state of the art" and will not be claimed. Adults, speaking into distant microphones connected to the toy's speaker, could put over specific points "ad lib."

I claim:

1. An improvement in inertial activator devices for transforming routine acceleration in speed or direction of an object into a signal indicating the acceleration by completing an electric circuit, the preferred form of the improvement comprising:

a container means holding an inertial switching device in the form of a cylindrical drum rotatable around an imaginary axis and having a weighted section cutting an arc in the periphery, inertia causing drum to rotate through a limited arc when it is accelerated in speed or direction;

one or more pairs of electric wires running lengthwise through the drum, one pair for each of one or more discrete positions of the drum, each pair terminating in end contacts at the drum surface where it makes contact with outside circuit wires by means of contacts positioned in said container means opposite said contacts for the pairs of wires in the drum; and an appropriate activating device connected to said outside circuit wires to signal selected accelerations of said object.

2. The substance of claim 1, said activating device being designed to signal automobile accelerations and comprising a plurality of lights of different colors selectively positioned on the car, each light being in a circuit completed when one of the discrete positions of said cylindrical drum positions the corresponding pair of wires therein in contact with the appropriate pair of said outside circuit wires.

3. An inertial activator device as described in claim 1, said activating device being designed to register the oscillations of an electrical coil as it moves within a magnetic field inducing an electric current in one direction when the coil moves up and in the reverse direction as the coil moves down, and to use this current to load a capacitor; said cylindrical drum having one pair of parallel wires to carry current in the same direction as that induced when the coil moves upward, and one pair of crossed wires to reverse the direction of the current produced when the coil moves downward, each pair being positioned to contact corresponding circuit wires leading to said capacitor by the inertia of said weighted section, the capacitor thus being loaded with uni-directional current.

References Cited

UNITED STATES PATENTS

| | | | |
|---|---|---|---|
| 1,887,823 | 11/1932 | Smith | 200—61.46 X |
| 2,846,814 | 8/1958 | Lettieri | 200—61.48 X |
| 2,943,418 | 7/1960 | Smith. | |
| 3,073,922 | 1/1963 | Miller | 340—71 X |

FOREIGN PATENTS

| | | |
|---|---|---|
| 712,369 | 10/1931 | France. |
| 339,307 | 12/1930 | Great Britain. |

JOHN W. CALDWELL, *Primary Examiner.*

D. L. TRAFTON, *Assistant Examiner.*

U.S. Cl. X.R.

200—61.46